US012647498B1

(12) United States Patent
Meisler et al.

(10) Patent No.: US 12,647,498 B1
(45) Date of Patent: Jun. 2, 2026

(54) CLOUD PROVIDER PRIVATE INSTANCE CONNECT SERVICE

(71) Applicant: Amazon Technologies, Inc., Seattle, WA (US)

(72) Inventors: Jacob Adam Meisler, Silver Spring, MD (US); Pallavi Ravishankar, Seattle, WA (US); Nicole Marie Catron, Mount Dora, FL (US); Stewart Allen, Seattle, WA (US); Daniel Lawrence Iannuzzi, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 153 days.

(21) Appl. No.: 18/333,219

(22) Filed: Jun. 12, 2023

(51) Int. Cl.
H04L 69/16 (2022.01)
H04L 61/50 (2022.01)

(52) U.S. Cl.
CPC ............. H04L 69/16 (2013.01); H04L 61/50 (2022.05)

(58) Field of Classification Search
CPC ............................... H04L 69/16; H04L 61/50
See application file for complete search history.

(56) References Cited

U.S. PATENT DOCUMENTS

| 12,506,816 | B2 * | 12/2025 | Pesci da Silva | ...... | H04L 69/162 |
| 2014/0330976 | A1 * | 11/2014 | van Bemmel | ........ | H04L 5/0055 |
| | | | | | 709/226 |
| 2019/0020723 | A1 * | 1/2019 | Kumar | .................. | H04L 63/029 |

| 2019/0141009 | A1 * | 5/2019 | Chang | ................. | H04L 61/2553 |
| 2019/0349444 | A1 * | 11/2019 | Cahill | ................... | H04L 65/612 |
| 2020/0389429 | A1 * | 12/2020 | Shribman | ............... | H04L 67/02 |
| 2021/0243281 | A1 * | 8/2021 | Duan | ..................... | H04L 1/008 |
| 2022/0156986 | A1 * | 5/2022 | Liang | ..................... | G06V 20/20 |
| 2023/0123781 | A1 * | 4/2023 | Kaimal | ................... | H04L 43/50 |
| | | | | | 726/12 |
| 2023/0171191 | A1 * | 6/2023 | Ignatchenko | ........... | H04L 69/16 |
| | | | | | 370/392 |
| 2024/0056885 | A1 * | 2/2024 | Zhu | ....................... | H04W 76/15 |

OTHER PUBLICATIONS

I Fette, RFC 6455: The WebSocket Protocol, Dec. 2011 (Year: 2011).*

* cited by examiner

*Primary Examiner* — Schquita D Goodwin
(74) *Attorney, Agent, or Firm* — Nicholson DeVos Webster & Elliott LLP

(57) ABSTRACT

Techniques for connecting to cloud-hosted instances without requiring those instances to have a public network address are described. A first WebSocket message including a first payload is received from an electronic device via a WebSocket connection. A first TCP/IP message including at least a portion of the first payload is sent to an instance hosted by a cloud provider network, the instance having a first network address on a first virtual network, and the first TCP/IP message including a second network address as a source address, traffic originating from the second network address being routable to the first virtual network. A second TCP/IP message including a second payload is received from the instance, the second TCP/IP message including the second network address as a destination address. A second WebSocket message including at least a portion of the second payload is sent to the electronic device sending via the WebSocket connection.

20 Claims, 9 Drawing Sheets

OPERATIONS
500

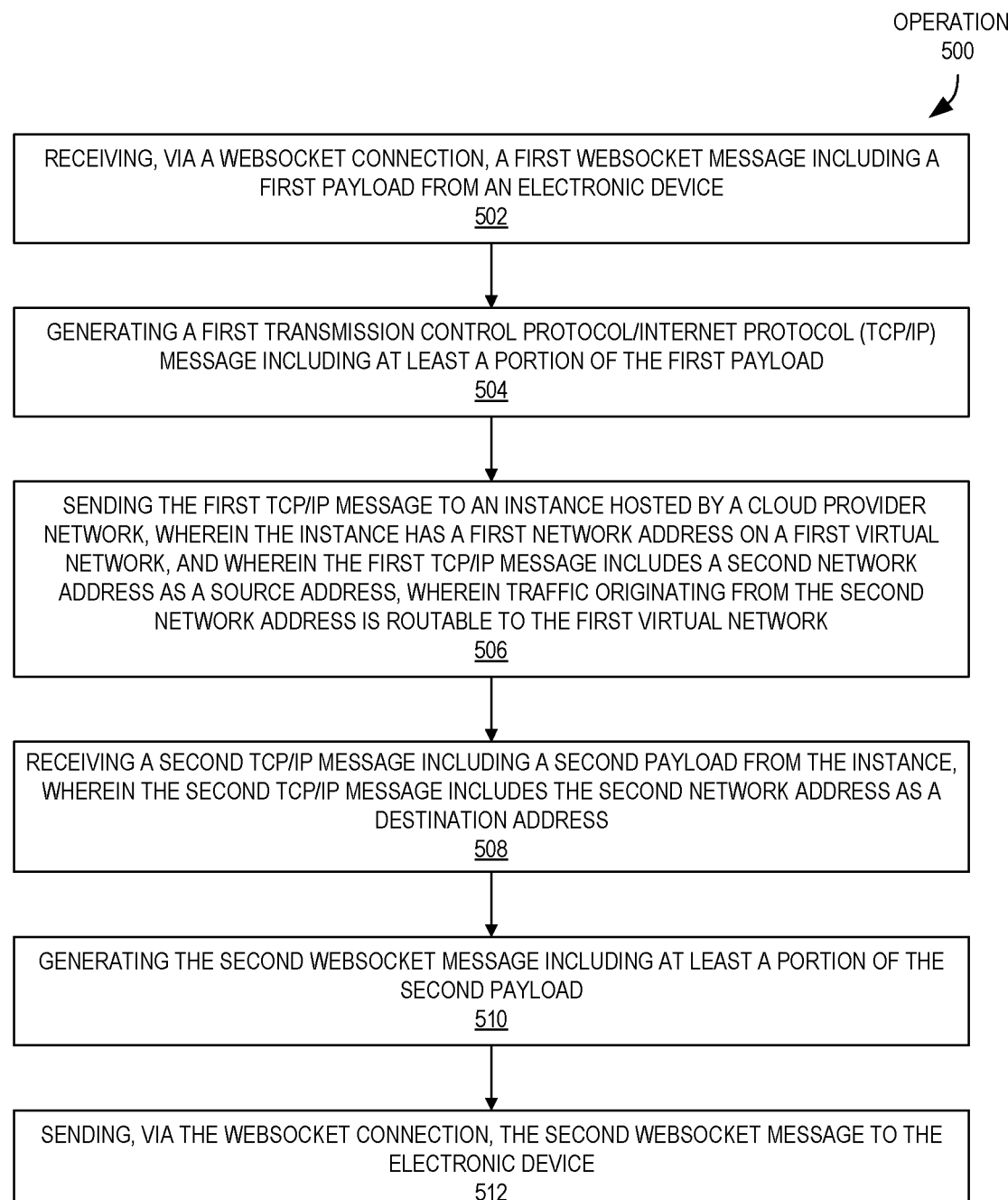

RECEIVING, VIA A WEBSOCKET CONNECTION, A FIRST WEBSOCKET MESSAGE INCLUDING A FIRST PAYLOAD FROM AN ELECTRONIC DEVICE
502

GENERATING A FIRST TRANSMISSION CONTROL PROTOCOL/INTERNET PROTOCOL (TCP/IP) MESSAGE INCLUDING AT LEAST A PORTION OF THE FIRST PAYLOAD
504

SENDING THE FIRST TCP/IP MESSAGE TO AN INSTANCE HOSTED BY A CLOUD PROVIDER NETWORK, WHEREIN THE INSTANCE HAS A FIRST NETWORK ADDRESS ON A FIRST VIRTUAL NETWORK, AND WHEREIN THE FIRST TCP/IP MESSAGE INCLUDES A SECOND NETWORK ADDRESS AS A SOURCE ADDRESS, WHEREIN TRAFFIC ORIGINATING FROM THE SECOND NETWORK ADDRESS IS ROUTABLE TO THE FIRST VIRTUAL NETWORK
506

RECEIVING A SECOND TCP/IP MESSAGE INCLUDING A SECOND PAYLOAD FROM THE INSTANCE, WHEREIN THE SECOND TCP/IP MESSAGE INCLUDES THE SECOND NETWORK ADDRESS AS A DESTINATION ADDRESS
508

GENERATING THE SECOND WEBSOCKET MESSAGE INCLUDING AT LEAST A PORTION OF THE SECOND PAYLOAD
510

SENDING, VIA THE WEBSOCKET CONNECTION, THE SECOND WEBSOCKET MESSAGE TO THE ELECTRONIC DEVICE
512

*FIG. 5*

CLOUD PROVIDER PRIVATE INSTANCE CONNECT SERVICE

BACKGROUND

Cloud computing environments often provide on-demand, managed computing resources to customers. Such computing resources (e.g., compute and storage capacity, databases, computing clusters, etc.) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various examples in accordance with the present disclosure will be described with reference to the following drawings.

FIG. 5 is a flow diagram illustrating operations of a method for proxying communications via a PIC service according to some examples.

DETAILED DESCRIPTION

Figure 1:
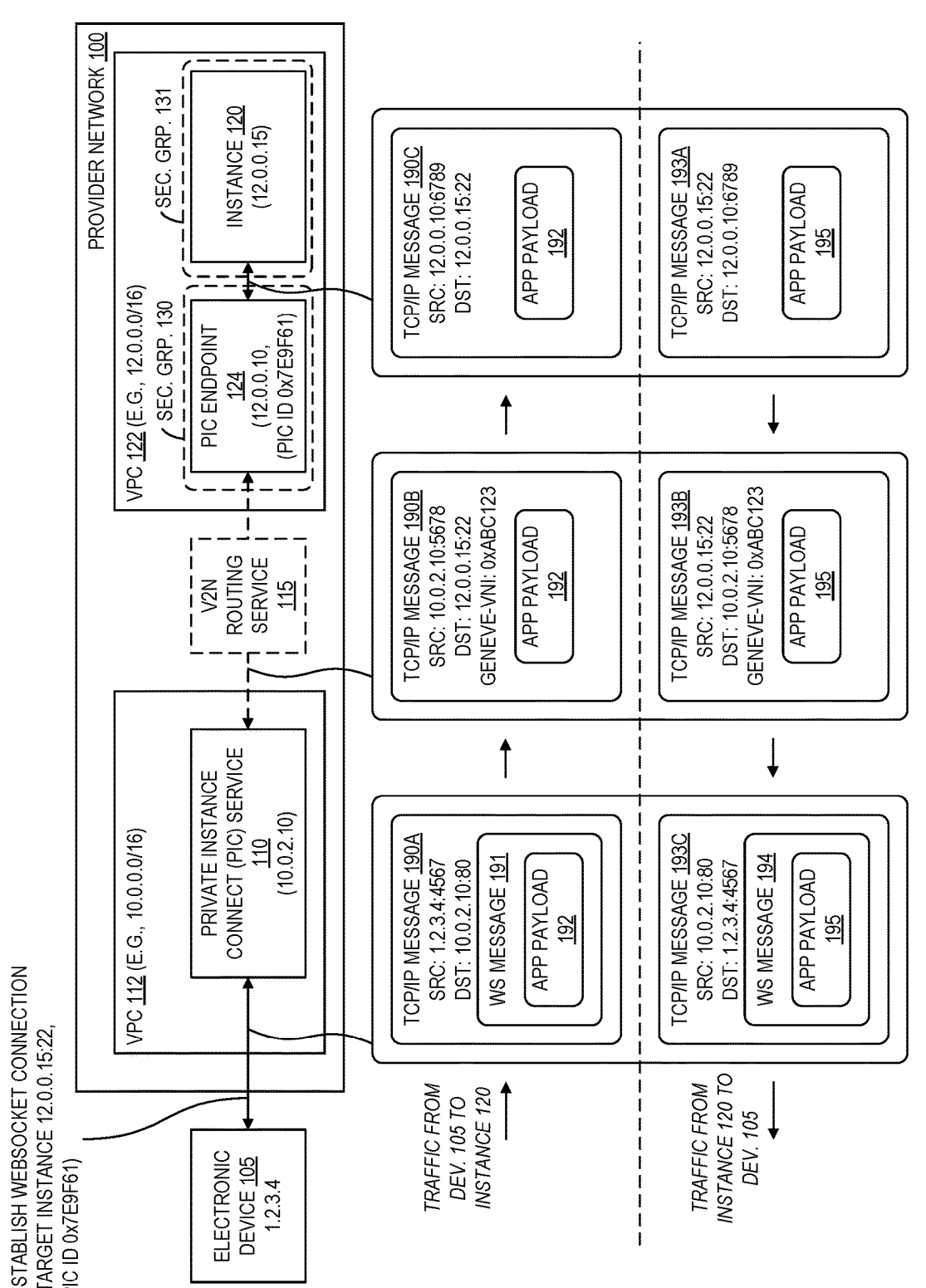
FIG. 1 illustrates an environment for a private instance connect (PIC) service of a cloud provider network according to some examples.

The present disclosure relates to methods, apparatus, systems, and non-transitory computer-readable storage media for a private instance connect service of a cloud provider network. A private instance connect (PIC) service allows customers of a cloud provider network to connect to their cloud-hosted instances without requiring those instances to have a public network address. In some examples, the PIC service acts as a multi-tenant WebSocket-to-Transmission Control Protocol (TCP) proxy that can provide for the authentication of connection requests to private instances and facilitate the routing of traffic to and from those instances. The private instance connect service can establish a WebSocket connection with an electronic device (e.g., a customer's computer system connected to the internet) and a TCP connection with a target instance, and proxy data transfers between the two. For example, a PIC service can include WebSocket frame payloads received from the electronic device in TCP packet payloads for transmission to the target instance and can include TCP packet payloads received from the target instance in Web-Socket frame payloads for transmission to the electronic device. In some examples, routing through the cloud provider network includes encapsulating TCP packets to traverse one or more subdivisions of the cloud provider network (e.g., regions, availability zones, etc.). By proxying WebSocket to TCP, the PIC service can support applications supported by TCP, including protocols such as SSH (Secure Shell) and RDP (Remote Desktop Protocol).

In the past, customers needed a public network address to connect to their instances. The term "instance" generally refers to any cloud-hosted resource such as virtual machines, containers, databases, computing clusters, or any application that can listen for TCP connections. Some more sophisticated customers adverse to using public network addresses on their instances chose to instead deploy bastion hosts. Bastion hosts have a public network address and tunnel connections and traffic to instances with private network addresses. Properly deploying and maintaining bastion hosts often requires specialized knowledge. Additionally, the use of bastion hosts incurs the operational overhead of patching, managing, and auditing as well as additional hosting costs. Examples of the PIC service described herein can reduce or eliminate the downsides associated with bastion hosts while still providing connectivity to instances without public network addresses. The PIC service can also improve security by restricting access to trusted users using identity and access management principles and audit trails.

In some examples, enabling private instance connectivity via the PIC service can be simple: customers request the creation of a PIC endpoint within their virtual private cloud including a private instance. The PIC endpoint is a virtual network endpoint that provides a foothold in a VPC through which the PIC service can route traffic to and from private instances. Customers can then direct their application to connect to a private instance via the PIC service, the connection request referencing an identifier assigned to a created PIC endpoint. The PIC service then provides for the connection to and traffic routing between the customer's application and the private instance.

FIG. 1 is a diagram illustrating an environment for a PIC service of a cloud provider network according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc.

The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action.

In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM can be provided with one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints. Additional details related to overlay networks are provided with reference to FIG. 7.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed service" that executes code or provides computing resources for its users in a managed configuration. Examples of managed services include a hardware virtualization service and a container service, and can also include database services (including relational and non-relational databases), edge computing services, machine learning services, cluster computing services, etc.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (micro VMs) in non-virtualized environments in fractions of a second. These VMMs can also enable container runtimes and container orchestrators to manage containers as micro VMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a micro VM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Another type of managed service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

The provider network 100 includes a private instance connect (PIC) service 110 that provides connectivity to cloud-hosted instances without requiring those instances to have a public-facing network address. An instance 120 is used to illustrate such connectivity. Assume the instance 120 has been launched in the cloud provider network using a managed service such as a hardware virtualization service or other such service as described elsewhere herein. The cloud provider network uses its resources to host the instance 120 (e.g., compute and memory resources, software resources, etc.).

In this example, the PIC service 110 is operating within virtual private cloud 112, and the instance 120 is operating within virtual private cloud 122. A PIC service can be formed of one or more service hosts, each of which can be a software application executed using resources of the cloud provider network. A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region. In this manner, VPCs can be considered overlay networks of the cloud provider network.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

VPCs/VNs often have virtualized components analogous to that of physical computer networks. Such components can include virtual network interfaces (VNIs) to attach a virtualized instance to the VN (sometimes referred to as elastic network interfaces), a virtual router to handle routing of traffic amongst the connected virtualized instances, virtual gateways to provide connectivity to or from resources outside of the virtual network, etc.

To facilitate connectivity between the PIC service 110 and instances hosted within VPCs. PIC endpoints are created within VPCs to provide an ingress/egress point for PIC service traffic. For example, a VPC-to-VPC (V2N) routing service 115 of the cloud provider network can exchange traffic between the VPC 112 of the PIC service 110 and other instances on a VPC including a PIC endpoint. During creation of a PIC endpoint, the PIC endpoint is assigned a PIC identifier that can later be used to identify the VPC. The PIC endpoint can be considered a VNI of a VPC. Additional details related to the creation of PIC endpoints are illustrated and described with reference to FIG. 2.

In this example, the VPC 112 has an address range of 10.0.0.16/16 (which may be the range assigned to a subnetwork (or subnet) of the VPC (not shown)). The PIC service 110 has an assigned network address (or just "address") of 10.0.2.10. The VPC 122 has an address range of 12.0.0.0/16 (again, which may be a range assigned to a subnet). The instance 120 has an assigned address of 12.0.0.15. A PIC endpoint 124 has been created within the VPC 122 to provide an ingress/egress point for PIC service traffic. The PIC endpoint 124 has an address of 12.0.0.10 and was assigned the PIC identifier of 0x7E9F61 upon creation.

In some examples, security groups can be associated to network level resources such as PIC endpoints and instances. As illustrated, the PIC endpoint 124 and instance 120 are associated with security groups 130 and 131, respectively indicated by their dashed borders. Security groups allow customers to configure rules regarding traffic entering or exiting objects associated with that group. Security group 130 allows the customer to limit where traffic can be sent from the PIC endpoint 124. For example, if the customer had two subnets within VPC 122, one for production instances and one for development instances, the customer could configure their security group to prevent accesses via the PIC endpoint to one or the other (e.g., to prevent access to the production instances). In some examples, security groups are enforced by a network service supporting the overlay networks such as VPCs.

At a high level, communications between the instance 120 and an electronic device 105 (or applications execution on each) involve two phases: establishing a connection between the electronic device 105 and the PIC service 110 and establishing a connection between the PIC service 110 and the instance 120. Although the electronic device 105 is illustrated outside of the provider network 100, the PIC service 110 can provide connectivity to other electronic devices within the provider network 100. More generally, the PIC service 110 facilitates connectivity for devices outside of the VPC including the target instance (in this case, outside of the VPC 122).

In the first phase, the electronic device 105 establishes a TCP session with the PIC service 110. The TCP session is typically established via a 3-part handshake (SYN, SYN-ACK, ACK) as will be appreciated by a person of skill in the art. Optionally, the TCP session may be cryptographically secured, such as by TLS. Once the session is established, the electronic device 105 can upgrade the TCP connection to a WebSocket connection by sending an HTTP request including the WebSocket upgrade to initiate a WebSocket handshake. As part of the handshake, the electronic device 105 identifies the address of the target instance as well as the PIC identifier of the PIC endpoint in the VPC including the target instance.

In some examples, users can use a web-based console or page of the cloud provider to connect to an instance via the PIC service 110. In other examples, users can connect via third party applications (e.g., executed on an electronic device 105) by adjusting how their application connects. For example, to SSH using a 3rd party SSH client like PUTTY or OpenSSH, users can configure the client to support SSH ProxyCommand by modifying their ~/.ssh/config file. For example, to:

```
# SSH over EC2 Instance Connect Endpoint
host i-* mi-*
    ProxyCommand sh -c "mssh connectivity-endpoint-proxy
      --host %h --port %p"
    ssh ec2-user@i-123456789012
```

In the illustrated example, the instance 120 is assigned a network address of 12.0.0.15 within a private range 12.0.0.0/16 of the VPC 122 (which may be a range associated with a virtual private cloud subnet, not shown). To facilitate connectivity to the instance, a PIC endpoint 124 is created within the customer VPC. During the creation of the PIC endpoint 125, it was assigned a PIC identifier of 0x7E9F61. The PIC service 110 can use a PIC identifier to direct received traffic to the appropriate VPC including a targeted instance. An illustrative opening WebSocket handshake message follows.

```
GET /chat HTTP/1.1
Upgrade: websocket
Connection: Upgrade
PICID: 0x7E9F61
Host: 12.0.0.15:22
```

Upon receipt of a WebSocket handshake message, the PIC service 110 acknowledge or deny the request. For example, the PIC service 110 can check whether the provided PIC identifier exists and, if so, begin the next phase. If the PIC identifier does not exist, the PIC service 110 can deny the upgrade request.

The PIC service 110 can store state data associated with the WebSocket connection and use the stored state information for subsequent proxying of traffic to and from a targeted instance. For example, the PIC service 110 can store the target instance IP address, port, and associated PIC identifier (e.g., 12.0.0.15:22 and 0x7E9F61) for use in addressing messages to the target instance and identifying messages from the target instance. The PIC service 110 can further store the source information of the initiator of the WebSocket handshake, such as the address and port number of the electronic device 105 (e.g., 1.2.3.4:4567) for use in addressing messages to the electronic device 105.

In the next phase, assuming the WebSocket handshake can proceed, the PIC service 110 can establish a TCP session with the target instance. As in the case of the TCP connection between the electronic device 105 and the PIC service 110, the PIC service 110 establishes a TCP session with the target instance, again typically via the 3-part handshake mentioned above, and again optionally cryptographically secured. In some examples, the PIC service 110 randomly assigns a port number to be used for its connection to the target instance (e.g., 5678). Once a TCP session has been established with the target instance, the PIC service 110 can complete the WebSocket handshake and begin proxying traffic.

To provide for the routing of the handshake and subsequent message traffic, the PIC service 110 generates messages including addressing information to allow the V2N routing service 115 of the cloud provider network to route the messages to the target instance, typically as part of the TCP and/or IP headers of the messages. As part of routing traffic between the PIC service 110 and a target instance, the V2N routing service 115 can also generate messages. The lower part of FIG. 1 illustrates these operations. In particular, the lower part of FIG. 1 illustrates exemplary "on-the-wire" traffic between the electronic device 105 and a target instance, in this case the instance 120. Messages 190A-C illustrate traffic from the electronic device 105 to the instance 120. Messages 193A-C illustrate traffic from the instance 120 to the electronic device 105.

During the TCP handshake between the PIC service 110 and the instance 120, the addressing information of TCP/IP messages 190B and 190C is illustrative of the addressing information of messages sent from the PIC service 110 to the instance 120 (e.g., for the SYN and ACK), and the addressing information of TCP/IP messages 193A and 193B is illustrative of the addressing information of messages sent from the instance 120 to the PIC service 110 (e.g., for the SYN-ACK).

Once the TCP handshake between the PIC service 110 and the instance 120, the PIC service 110 can complete the WebSocket handshake (by providing an HTTP response to the electronic device 105's HTTP request that indicates the communications protocol is switching to WebSocket). In other examples, the PIC service 110 can complete the WebSocket handshake prior to establishing the TCP session with the target instance, typically buffering any traffic received over the WebSocket connection prior to the TCP session establishment. In any case, once the TCP session between the PIC service 110 and the instance 120 is established, the PIC service 110 can begin proxying application traffic (e.g., WebSocket or TCP payloads) between the electronic device 105 and the target instance.

For example, the electronic device 105 sends a TCP/IP message 190A to the PIC service 110, the addressing information of the message 190A including a source address and port of the electronic device (e.g., 1.2.3.4:4567) and a destination address and port of the PIC service (e.g., 10.0.2.10:80). The message 190A includes as payload a WebSocket message 191, the WebSocket message 191 including an application data payload 192 (e.g., SSH, RDP, or other TCP-supported application data).

Using its stored state data, the PIC service 110 can identify the TCP/IP message 190A as associated with the TCP connection to the instance 120 (e.g., based on the source address and port) and generate a TCP/IP message 190B including associated addressing information. In this example, the message 190B includes a virtual network identifier, the source address and randomly assigned port number (e.g., 10.0.2.10:5678), and the stored destination address and port (e.g., 12.0.0.15:22). Note that the virtual network identifier provides routing information to the V2N routing service 115 to route the message 190B over the substrate to the VPC 122. The PIC service 110 also includes the application payload 192 from the WebSocket message 191 in the TCP/IP message 190B (e.g., by copying the WebSocket frame payload into the TCP payload).

For example, under the Geneve protocol described in Internet Engineering Task Force (IETF) Request for Comments (RFC) 8926, a Geneve Virtual Network Identifier (Geneve-VNI) serves to provide tunneling information (not to be confused with the "VNI"-virtual network interface described above). In some examples, the PIC identifier can serve as the Geneve-VNI. In other examples, the PIC service 110 can use a PIC identifier to lookup an associated Geneve-VNI (e.g., via a database that associates VPC elements such as a PIC identifier associated with the endpoint to Geneve-VNIs). In the illustrated example, the PIC identifier allows the PIC service 110 to lookup the virtual network identifier or Geneve-VNI associated with VPC 122-0xABC123).

Upon receipt of TCP/IP message 190B, the V2N routing service 115 use the Geneve-VNI and destination address to identify where on the physical substrate to route the message. Prior to sending a message out on the VPC 122, the V2N routing service 115 generates a TCP/IP message 190C including associated addressing information such that the message 190C appears to originate from the PIC endpoint 124. The V2N routing service 115 also includes the application payload 192 from the TCP/IP message 190B in the TCP/IP message 190C.

In this example, the TCP/IP message 190C includes a source address and port of the PIC endpoint 124 (e.g., 12.0.0.10:6789). Note that the source address corresponds to the network address of the PIC endpoint 124. The source port may have been randomly assigned by the V2N routing service during routing of the first message (e.g., of the SYN during the TCP handshake) for use in sending subsequent messages. The TCP/IP message 190C includes the destination address and port corresponding to that indicated during the initial WebSocket connection establishment with the PIC service (e.g., 12.0.0.15:22).

The V2N routing service 115 can store state data associated with the connection between the PIC service 110 and the instance 120. For example, the V2N routing service 115 can store the port assigned for use in transmitting to/from the PIC endpoint 124 to the instance 120 (e.g., 6789), the source address and port associated with the connection from the PIC service 110 (e.g., 10.0.2.10:5678), an a Geneve-VNI associated with the PIC service 110 or VPC 112.

The instance 120 can receive and respond to the TCP/IP message 190C. Note that in the example described above, from the perspective of the instance 120, the TCP/IP message 190C appears to have originated from the local VPC. The instance 120 can send its response as TCP/IP message 193A, the addressing information of the message 193A including a source address and port of the connection with the instance (e.g., 12.0.0.15:22) and a destination address and port of the PIC endpoint 124 (e.g., 12.0.0.10:6789). The message 193A further includes application data payload 195.

Upon receipt of TCP/IP message 193A, the V2N routing service 115 uses its stored state data to generate TCP/IP message 193B. Using the addressing information of TCP/IP message 193A, the V2N routing service 115 can identify the addressing information of the PIC service 110. For example, the V2N routing service 115 can determine that messages from 12.0.0.15:22 to 12.0.0.10:6789 are associated with the PIC tunnel that originated with 10.0.2.10:5678 via Geneve VNI 0xABC123 (e.g., in TCP/IP message 190B). 111 The V2N routing service 115 uses this information to form the addressing information of TCP/IP message 193B. The message 193B includes the application data payload 195.

Upon receipt of TCP/IP message 193B, the PIC service 110 uses its stored state data to generate TCP/IP message 193C. Using the addressing information of TCP/IP message 193B, the PIC service 110 can identify the addressing information associated with the electronic device 105. For example, the PIC service 110 can determine that messages from 12.0.0.15:22 to its port 5678 (assigned previously) are associated with the PIC tunnel between the instance 120 and the electronic device 105, thus addressing TCP/IP message 193C to the electronic device 105 (e.g., to 1.2.3.4:4567. As part of generating the TCP/IP message 193C, the PIC service 110 includes the application data payload 195 in a WebSocket message 194 that is included within the TCP/IP message 193B.

Note the use of the term messages here generally refers to units under the associated protocol. For example, an IP datagram including a TCP packet is generally referred to herein as a TCP/IP message. The TCP packet payload can be a WebSocket frame, again generally referred to herein as a WebSocket message.

Note that the term generating as used in the context of generating messages can include, for example, creation of a new message or re-writing a received message to add, modify, or delete message metadata (such as headers, checksums, footers, etc.). For example, generating can include modifying addressing information, removing encapsulating headers and checksums, copying a payload from one message into a new message, etc.

In some examples, the PIC service 110 may fragment either a WebSocket payload (e.g., from the WebSocket connection with an electronic device) or a TCP payload (e.g., from the connection with a targeted instance) to relay the payload across the proxy. For example, the PIC service 110 may fragment a WebSocket payload into two or more TCP payloads (or TCP/IP messages) sent to a target instance. Likewise, the PIC service 110 may fragment a TCP payload into two or more WebSocket payloads (or TCP/IP messages including a WebSocket message) sent to an electronic device. Thus, in such cases, the PIC service 110 can include a portion of the payload of an inbound message (e.g., from either side of the proxy) in an outbound message (to the other side of the proxy).

As noted above, the PIC service 110 provides connectivity to hosted instances without requiring those instances to have a public network address (or, for that matter, other provisions to access the instance from outside of the instance's VPC). The PIC service 110 can also provide connectivity to those instances that can be accessed from outside of their VPC. Customers can leverage the known ingress and egress point of a PIC endpoint to provide more specific controls over other types of traffic that may be traversing their VPC, such as traffic originating from outside of the VPC. For example, customers can allow HTTP traffic to their hosted instance via a publicly routable path while denying management traffic such as SSH or RDP via that same path. Customers can then provide connectivity for management traffic via the PIC service 110.

Figure 2:
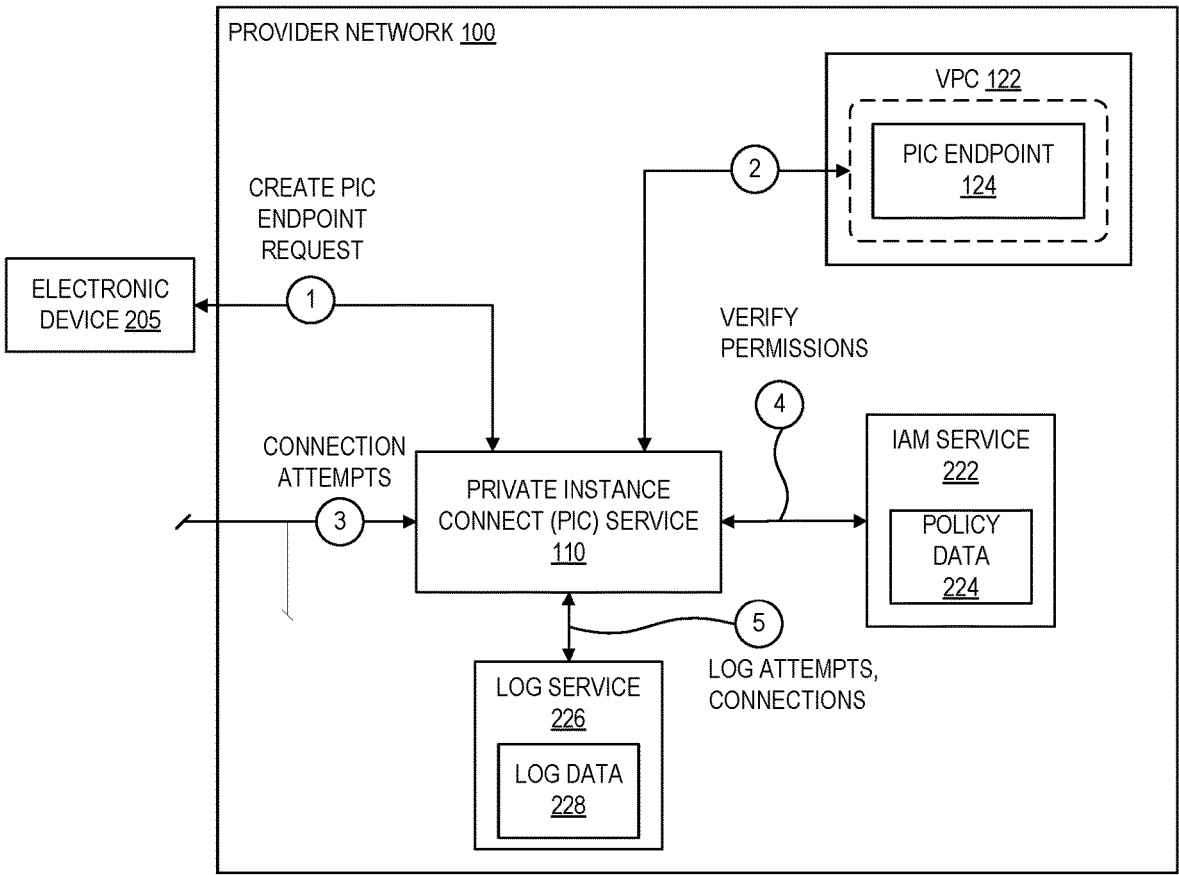
FIG. 2 illustrates configuration and management aspects of a PIC service according to some examples.

FIG. 2 illustrates configuration and management aspects of a PIC service according to some examples. Various operations are described with reference to the circled numbers 1 through 5. As indicated above, a PIC endpoint provides a foothold in a VPC through which the PIC service can route traffic to and from private instances.

At circle 1, the PIC service 110 receives a request to create a PIC endpoint, the request including an identification of the VPC in which to create the PIC endpoint. The PIC service 110 will create (or have created, such as via an intermediate management service) a PIC endpoint within the identified VPC. For example, if the request identifies VPC 122, the PIC endpoint 124 will be created, as indicated at circle 2. During creation of the endpoint, the PIC service 110 (or other service) will assign an available network address from the VPC to the endpoint, and also assign a PIC endpoint identifier. The PIC service 110 can return the assigned PIC endpoint identifier to the electronic device 205. The user can then use that PIC endpoint identifier in subsequent connection attempts to the instance (e.g., such as part of the WebSocket handshake described above).

At circle 3, the PIC service 110 receives instance connection attempts (e.g., WebSocket upgrade requests such as described above). Such requests may originate from outside of the provider network (e.g., from electronic device 105) or from within the provider network, typically from outside of the VPC including the targeted instance.

At circle 4, the PIC service 110 verifies permissions with an IAM service 222. Briefly, an IAM service provides control over access to cloud-based resources. Often, users manage permissions by specifying policies associated with users, groups of users, user roles, or other identifiers. Taking a user for example, an example policy can indicate what actions the user is allowed to perform and on what resources those actions can be performed. The IAM service 222 can store such policies in policy data 224. The PIC service 110 can verify permissions associated with PIC endpoint creation requests, verifying that a policy exists that permits the user (or their role, group, etc.) to create PIC endpoints. The PIC service 110 can also verify permissions associated with PIC connection requests, verifying that a policy exists that permits the user to connect to a particular instance via the PIC service 110.

At circle 5, the PIC service 110 can log events with a logging service 226. The logging service can record actions taken by a user as events in log data 228. For example, upon receiving a request to create a PIC endpoint, the PIC service 110 can log information associated with the request via the logging service 226. Such information can include, for example, an identification of the requestor, whether the request was permitted, and a reference to the resulting resource that was created (e.g., the PIC endpoint 124), if successful. Likewise, for inbound connection attempts via the PIC service to a target instance, the PIC service 110 can log information associated with those requests. Such information can include, for example, an identification of the requestor, whether the request was permitted, when the connection was started, and when the connection was terminated.

Figure 3:
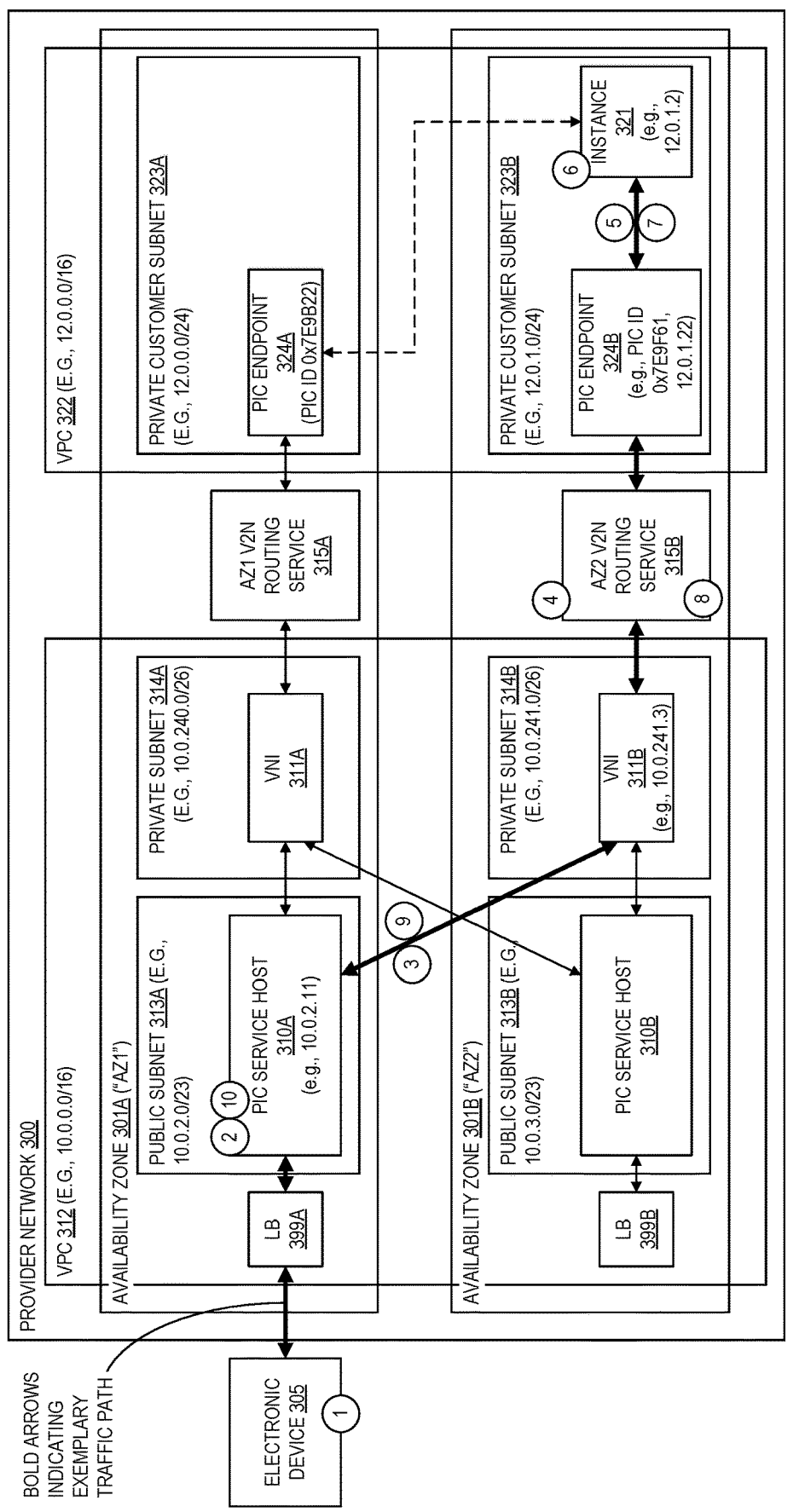
FIG. 3 illustrates another environment for a PIC service of a cloud provider network according to some examples.

FIG. 3 illustrates another environment for a PIC service of a cloud provider network according to some examples. In some cases, the cloud provider network architecture may introduce additional hops between a PIC service and a target instance. In such cases, additional routing information can be embedded in one or more levels of TCP/IP packet encapsulation. To illustrate, FIG. 3 illustrates a cloud provider network 300 subdivided into availability zones 301 (which may be subdivisions of a larger subdivision of the cloud provider network 300, such as a region). Two availability zones 301A and 301B are illustrated, respectively referred to as AZ1 and AZ2.

The PIC service operates in a VPC 312, the "PIC service" formed of a collection of PIC service hosts 310 operating in the various availability zones 301. A PIC service host 310A operates in a public subnet 313A of a PIC service VPC 312 in AZ1, and a PIC service host 310B operates in a public subnet 313B of the PIC service VPC 312 in AZ2. The PIC service host 310A can provide instance connectivity for requests originating via a load balancer 399A of AZ1, while a PIC service host 310B can provide instance connectivity for requests originating via a load balancer 399B of AZ2.

In this example, each PIC service host 310 has connectivity to each of the other availability zones via a VNI 311 in a private subnet 314 of the PIC service VPC 312 in that particular availability zone. VNI 311A in private subnet 314A provides PIC service host 310A and PIC service host 310B with connectivity to instances in AZ1, while VNI 311B in private subnet 314B provides PIC service host 310A and PIC service host 310B with connectivity to instances in AZ2. A V2N routing service 315 of the availability zones provides for the cross-VPC traffic within an availability zone. Placing the VNIs of the PIC service that provide for the cross-VPC traffic in private subnets 314 can improve the security posture of the PIC service by limiting the types of traffic that are permitted to enter the private subnets 314.

In the example that follows, an electronic device 305 establishes connectivity to an instance 321 in the environment illustrated in FIG. 3. An example set of operations are described with reference to circles 1 through 10.

At circle 1, the electronic device 305 initiates a connection with the PIC service (e.g., a TLS connection to the endpoint). The load balancer 399A picks a PIC service host instance from a target group (e.g., if multiple PIC service hosts are present in the associated VPC) and forwards the connection to the selected PIC service host. Typically operating at layer 4, the load balancer 399A is oblivious to the intended destination of the connection. Selecting PIC service host 310A, the load balancer proxies the connection. Once a TCP/IP (or TLS) session is established between the electronic device 305 and the PIC service host 310A, the electronic device 305 sends an HTTP request initiating a WebSocket handshake (e.g., to upgrade the connection).

At circle 2, the PIC service host 310 receives the HTTP request. The PIC service host 310A authenticates the request. The HTTP request includes identifying information of the target instance, such as described above. From the identifying information included with the HTTP request, the PIC service host 310A knows the PIC identifier associated with the PIC endpoint and target instance address (in this example, 0x7E9F61 and 12.0.1.2, respectively). Using that information, the PIC service host 310A can establish a TCP/IP session with the identified instance (and later proxy WebSocket payloads from the electronic device 305 into that session or TCP payloads from the instance into the WebSocket session with the electronic device 305). Taking the TCP/IP handshake as an example, the PIC service host 310A can generate a packet including the opening SYN message. Using the identifying information from the HTTP request, the PIC service host 310A can determine that the outbound packet should be routed through VNI 311B given the target instance is in AZ2. The PIC service host 310A generates a packet that is sent to the AZ2 V2N routing service 315B. That packet includes an inner packet encapsulated within an outer packet. An exemplary inner packet includes:

a source IP address corresponding to the IP address of the PIC service host 310A (e.g., 10.0.2.11);

a source port corresponding to a port the PIC service host 310A selected and assigned to the session;

a destination IP address corresponding to the target instance's IP address in the customer VPC 322 (e.g., 12.0.1.2); and a destination port corresponding to the destination port conveyed in the HTTP request (e.g., 22 in the case of SSH).

An exemplary outer packet includes:

a source IP address corresponding to the IP address of the PIC service host 310A (e.g., 10.0.2.11);

the source port corresponding to the port the PIC service host 310A selected and assigned to the session (same as inner packet);

a destination IP address corresponding to the PIC service VNI of the availability zone that includes the target instance (e.g., 10.0.241.3);

the destination port corresponding to the destination port conveyed in the HTTP request (e.g., 22 in the case of SSH); and a Geneve-VNI that provides the routing information for a V2N routing service to identify the VPC including the target instance (recall the PIC identifier included in the earlier HTTP message (e.g., 0x7E9F61) can serve as the Geneve-VNI or can be used to lookup an associated Geneve-VNI such as via a database that associates VPC elements to Geneve-VNIs.

The above addressing information of both of the inner and outer packets is typically included in the header field(s) associated with the packets (e.g., IP and TCP headers). The payload of the inner packet can be the TCP SYN (or later ACK) sent from the PIC service host 310A to the target instance during the TCP handshake or the WebSocket payload sent from the electronic device 305 being proxied to the target instance (e.g., once the TCP session is established). The payload of the outer packet can include the inner packet.

At circle 3, the PIC service host 310A sends the generated packet to the AZ2 V2N routing service 315B via the VNI 311B. The PIC service host 310A stores the source port assigned to the session (to facilitate subsequent routing of messages).

At circle 4, the AZ2 V2N routing service 315B receives the packet and decapsulates it. Given the Geneve-VNI included in the outer packet header, the AZ2 V2N routing service 315B can determine that the inner packet is destined for subnet 323B (that includes the PIC endpoint 324B associated with the Geneve-VNI) knows to route the inner packet to subnet 323B of VPC 322. If the message is part of a new flow (e.g., during TCP session establishment between the PIC service and the target instance), the AZ2 V2N routing service 315B can allocate a random source port to use (and re-use for subsequent traffic of the session). The AZ2 V2N routing service 315B generates a packet to be sent from the PIC endpoint 324B to the target instance 321. That generated packet includes, in some examples:

a source IP address corresponding to the IP address of the PIC endpoint 324B (e.g., 12.0.1.22);

a source port corresponding to a port the AZ2 V2N routing service 315B selected and assigned to the session (e.g., 5678);

a destination IP address corresponding to the target instance's IP address in the customer VPC 322 (e.g., 12.0.1.2); and a destination port corresponding to the destination port conveyed in the HTTP request (e.g., 22 in the case of SSH).

At circle 5, the AZ2 V2N routing service 315B sends the generated packet to the target instance via the PIC endpoint 324B. The AZ2 V2N routing service 315B stores the source port assigned to the session (to facilitate subsequent routing of messages).

At circle 6, the target instance 321 receives the packet and reverses the header to respond with a generated packet including the SYN-ACK portion of the handshake (or in subsequent communications with an application response payload). At circle 7, the target instance 321 sends that generated packet to the PIC endpoint 324B. That packet includes, in some examples:

a source IP address corresponding to the target instance's IP address in the customer VPC 322 (e.g., 12.0.1.2);

a source port corresponding to the destination port conveyed in the HTTP request (e.g., 22 in the case of SSH);

a destination IP address corresponding to the IP address of the PIC endpoint 324B (e.g., 12.0.1.22); and a destination port corresponding to the port the AZ2 V2N routing service 315B selected and assigned to the session (e.g., 5678).

At circle 8, the AZ2 V2N routing service 315B receives the packet. Using stored state data and the addressing information of the packet, the AZ2 V2N routing service 315B can determine that the packet is to be routed to the PIC service host 310A via the VNI 311B. The AZ2 V2N routing service 315B a packet that is sent to the PIC service host 310A. That packet includes an inner packet encapsulated within an outer packet.

An exemplary inner packet includes:

a source IP address corresponding to the IP address of target instance (e.g., 12.0.1.2);

a source port corresponding to the destination port conveyed in the HTTP request (e.g., 22 in the case of SSH);

a destination IP address corresponding to the IP address of the PIC service host 310A (e.g., 10.0.2.11); and a destination port corresponding to the port the PIC service host 310A selected and assigned to the session at circle 2, above.

An exemplary outer packet includes:

a. a source IP address corresponding the PIC service VNI through which traffic is routed (e.g., 10.0.241.3);

b. a source port corresponding to the destination port conveyed in the HTTP request (e.g., 22 in the case of SSH);

c. a destination IP address corresponding to the IP address of the PIC service host 310A (e.g., 10.0.2.11); and d. a destination port corresponding to the port the PIC service host 310A selected and assigned to the session at circle 2, above.

e. a Geneve-VNI that provides the routing information for a V2N routing service to identify the VPC including the target instance (recall the PIC identifier included in the earlier HTTP message (e.g., 0x7E9F61) can serve as the Geneve-VNI or can be used to lookup an associated Geneve-VNI such as via a database that associates VPC elements to Geneve-VNIs.

The outer packet can further include a Geneve-VNI associated with the VNI 311B. The AZ2 V2N routing service 315B can store such a Geneve-VNI during operations described at circle 4.

Again, the above addressing information of both of the inner and outer packets is typically included in the header field(s) associated with the packets (e.g., IP and TCP headers). The payload of the inner packet can be the TCP SYN-ACK sent from the target instance to the PIC service host 310A during the TCP handshake or the TCP payload sent from the target instance to the electronic device 305. The payload of the outer packet can include the inner packet.

At circle 9, the AZ2 V2N routing service 315B sends the generated packet to the PIC service host 310A via the VNI 311B.

At circle 10, the PIC service host 310A can complete the TCP handshake (e.g., by sending an ACK back to the target instance 321) and, if pended, complete the WebSocket handshake with the electronic device 305 (by sending the HTTP message indicating the protocol upgrade to Web-Socket).

Once both the WebSocket session between the electronic device 305 and the PIC service host 310A and the TCP session between the PIC service host 310A and the target instance 321 have been established, the PIC service host 310A can serve to proxy traffic in either direction between the electronic device 305 and the target instance 321.

In some examples, such as if a customer has not created a VNI within an availability zone of a targeted instance, the customer can alternatively rely on intra-VPC routing to deliver packets across AZs. Assuming the PIC endpoint 324B did not exist, a customer could still establish communications with the target instance 321 by providing the endpoint identifier associated with PIC endpoint 324A in the WebSocket handshake request such as described above, relying on the intra-VPC routing to relay the traffic across AZs, as indicated by the dashed line.

In some examples, inter-VPC networking such as VPC-to-VPC peering can provide routing between a PIC endpoint within one VPC and a target instance in another VPC. For example, assume that subnets 323A and 323B were instead separate, peered VPCs, with each having a route table directing traffic to the CIDR block associated with its peer to that VPC. In such a case, a customer could still establish communications with the target instance 321 by providing the endpoint identifier associated with PIC endpoint 324A in the WebSocket handshake request such as described above, relying on the inter-VPC routing to relay the traffic across the assumed VPCs, as indicated by the dashed line.

Figure 4:
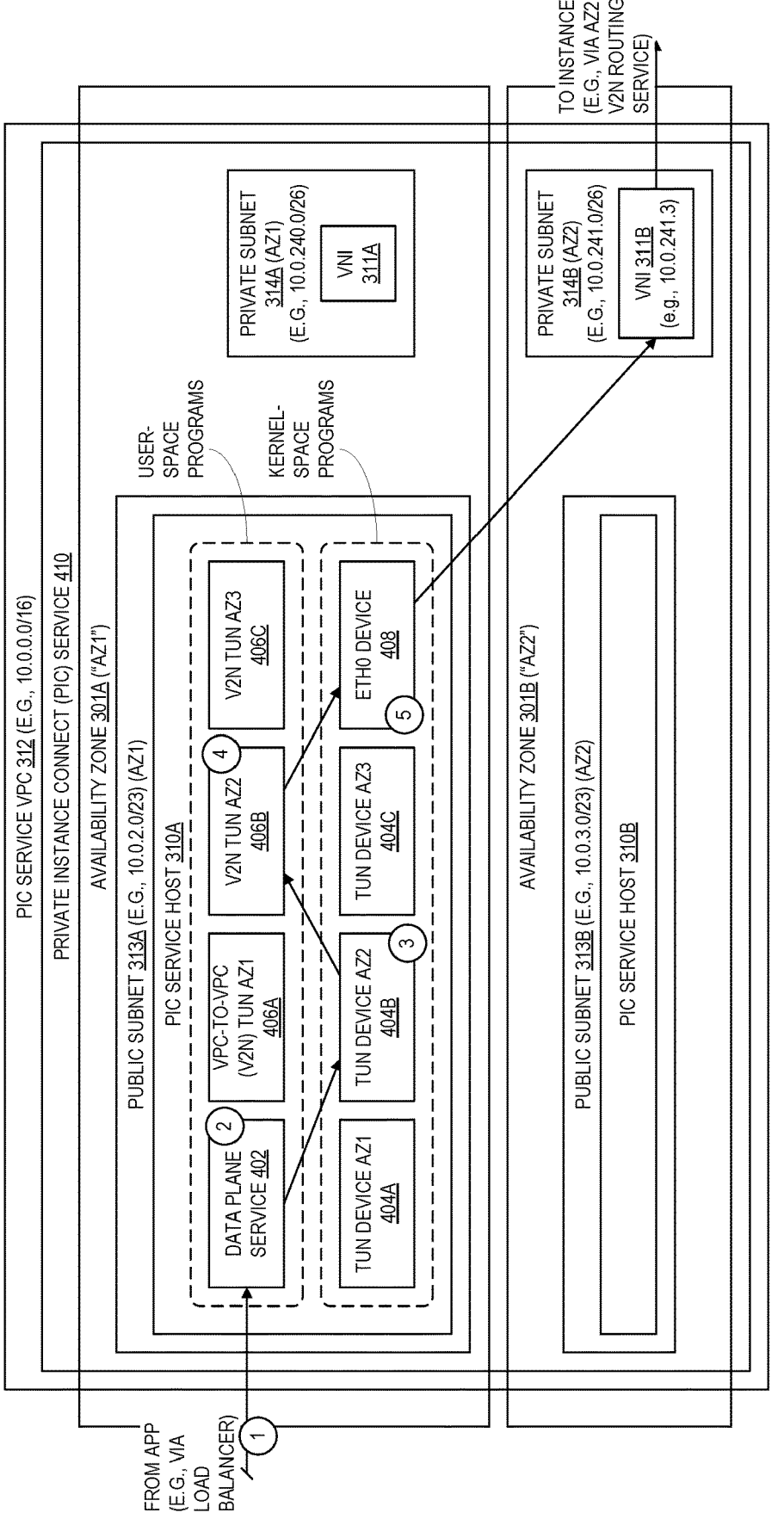
FIG. 4 illustrates an architecture of a PIC service host according to some examples.

FIG. 4 illustrates an architecture of a PIC service host according to some examples. In the cloud provider network architecture including multiple subdivisions such as illustrated and described with reference to FIG. 3, a PIC service informs a V2N routing service where to route packets by encapsulating those packets using a protocol such as Geneve. One common approach to using Geneve is to create a Geneve interface per-tunnel. In the case of a PIC service, that would mean one Geneve interface per PIC endpoint. Given the number of potential customers, that is a significant number of interfaces. Not only do such interfaces typically require elevated privileges, which present security challenges, the time to establish Geneve interfaces is non-trivial, limiting the ability of a PIC service to scale up or down its hosts. FIG. 3 illustrates a PIC service host architecture that reduces the number of Geneve interfaces.

A PIC service host 310A of availability zone 301A includes a TUN device for each of the other availability zones of the cloud provider network (or regional subdivision of the cloud provider network that includes the availability zones). TUN devices are kernel space virtual devices that receive packets from a user space program and write them to a user space program. As illustrated, the PIC service host 310A includes a TUN device 404A for AZ1, a TUN device 404B for AZ2, and a TUN device 404C for AZ3. A data plane service 402 of the PIC service host 310A receives incoming packets. Based on the packets either being sent over an existing WebSocket connection or addressing information included in a WebSocket upgrade request, the data plane service 402 can determine which AZ includes a targeted instance. For example, the data plane service 402 can identify the AZ based on state data of an existing WebSocket session or on a PIC endpoint identifier included in a WebSocket handshake. The TUN devices relay those packets to another program to perform the Geneve-level encapsulation (e.g., circle 2 of FIG. 3) or decapsulation (e.g., circle 10 of FIG. 3.) for their associated AZ. That user space program is referred to as a V2N TUN program or just V2N TUN. Each TUN device 404 has an associated V2N TUN 406 (e.g., 404A is associated with 406A). The V2N TUN 406 parses the fields out of the address of the packet to generate a packet to be sent out through a kernel space eth0 device (e.g., a network adapter of the host, a virtual network adapter associated with an underlying host network adapter).

An exemplary addressing scheme includes a/64 link local CIDR assigned to each tunnel with the first 32 bits being an assigned prefix and the second 32 bits being an IPV4 address of the VNI for the AZ tunnel. For example, the tunnel for a service VNI 311B with the IP address 10.0.241.3 would be fe80: 0000:0a00: f10:/64 where fe80: 0000 represents the PIC service assignment and 0a00: f103 corresponds to the hexadecimal value of the IP address of the service VNI 311B. If the PIC service host 310A is sending traffic to a PIC endpoint with an endpoint identifier (or Geneve-VNI) of 0xde0633 and a target instance having an IP address of 10.0.1.89 (0x0a000159), the full address would be fe80: 0000:0a00: f103: 00de: 0633:0a00: 0159, where the first 64-bits corresponds to the prefix described above, the next 32 bits correspond to the endpoint identifier (with leading zeros), and the final 32 bits correspond to the IP address of the target instance.

An example set of operations of the components of a PIC service host are now described with reference to circles 1 through 5. At circle 1, the PIC service host 310A receives a customer-initiated connection request to the PIC service, which is handled by the data plane service 402. The request includes the PIC endpoint identifier and destination IP address (the IP address of the target instance) in, for example, the HTTP request initiating the WebSocket handshake. After authenticating and authorizing the request, the data plane service 402 obtains the PIC VNI associated with the target AZ (e.g., by a database lookup of the PIC endpoint identifier). The data plane service 402 also upgrades the HTTP connection to a WebSocket connection (e.g., such as once the initial upgrade request is authenticated or after the TCP session with the target instance is established). In this example, the connection request identifies a target instance in AZ2.

At circle 2, the data plane service 402 uses the PIC VNI associated with the AZ of the target instance and sends a SYN packet to the TUN device 404B for AZ2, constructing the destination IPv6 address using the schema defined above. At circle 3, the TUN device 404B for AZ2 receives the packet and sends it to the associated V2N TUN 406B for AZ2.

At circle 4, the V2N TUN 406B parses the addressing information of the packet and writes a packet including an inner and outer packet (such as described with reference to circle 2 of FIG. 3) to the eth0 device 408. Continuing with the above addressing example, an exemplary inner packet includes:
   a source IP address corresponding to the IP address of the PIC service host 310A (e.g., 10.0.2.11);
   a source port corresponding to a port the data plane service 402 selected and assigned to the session;
   a destination IP address corresponding to the target instance's IP address in the customer VPC; and
   a destination port corresponding to the destination port conveyed in the HTTP request.
An exemplary outer packet includes:
   a source IP address corresponding to the IP address of the PIC service host 310A (e.g., 10.0.2.11);
   the source port corresponding to the port the data plane service 402 selected and assigned to the session (same as inner packet);
   a destination IP address corresponding to the PIC service VNI of the availability zone that includes the target instance (e.g., 10.0.241.3);
   the destination port corresponding to the destination port conveyed in the HTTP request; and
   a Geneve-VNI that provides the routing information for a V2N routing service to identify the VPC including the target instance (recall the PIC identifier included in the earlier HTTP message (e.g., 0x7E9F61) can serve as the Geneve-VNI or can be used to lookup an associated Geneve-VNI such as via a database that associates VPC elements to Geneve-VNIs.

At circle 5, the Geneve packet is sent to eth0 for transmission over the cloud provider network.

FIG. 5 is a flow diagram illustrating operations 500 of a method for proxying communications via a PIC service according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by a PIC service of the other figures.

The operations 500 include, at block 502, receiving, via a WebSocket connection, a first WebSocket message including a first payload from an electronic device. For example, the PIC service or a PIC service host such as described herein can receive WebSocket communications (e.g., message 190A).

The operations 500 further include, at block 504, generating a first Transmission Control Protocol/Internet Protocol (TCP/IP) message including at least a portion of the first payload. The operations 500 further include, at block 506, sending the first TCP/IP message to an instance hosted by a cloud provider network, wherein the instance has a first network address on a first virtual network, and wherein the first TCP/IP message includes a second network address as a source address, wherein traffic originating from the second network address is routable to the first virtual network. For example, the payload (or a portion thereof) received in the WebSocket message is sent to the target instance in a TCP/IP message from a PIC endpoint on the VPC of the target instance (e.g., message 190C). Various routing operations can occur between receiving the WebSocket message and sending the TCP/IP message based on the network configuration of the cloud provider network and of any overlay networks. As another example, such as in the case of peered VPC networks, a TCP/IP message can originate from a PIC endpoint in one virtual network and target an instance in another virtual network, provided the two virtual networks are peered or otherwise have routability between them (e.g., via route tables that allow for traffic to transit between the virtual networks). The second network address can also be of the first virtual network, such as in the case where an endpoint and target instance are within the same virtual network.

The operations 500 further include, at block 508, receiving a second TCP/IP message including a second payload from the instance, wherein the second TCP/IP message includes the second network address as a destination address. As described herein, the target instance can send traffic back to the electronic device by routing TCP/IP messages to the PIC endpoint on its VPC (e.g., message 193A).

The operations 500 further include, at block 510, generating the second WebSocket message including at least a portion of the second payload. The operations 500 further include, at block 512, sending, via the WebSocket connection, the second WebSocket message to the electronic device. For example, the PIC service can package the payload of the TCP/IP message sent by the target instance into a WebSocket message for sending over the WebSocket connection to an electronic device (e.g., message 193C).

Figure 6:
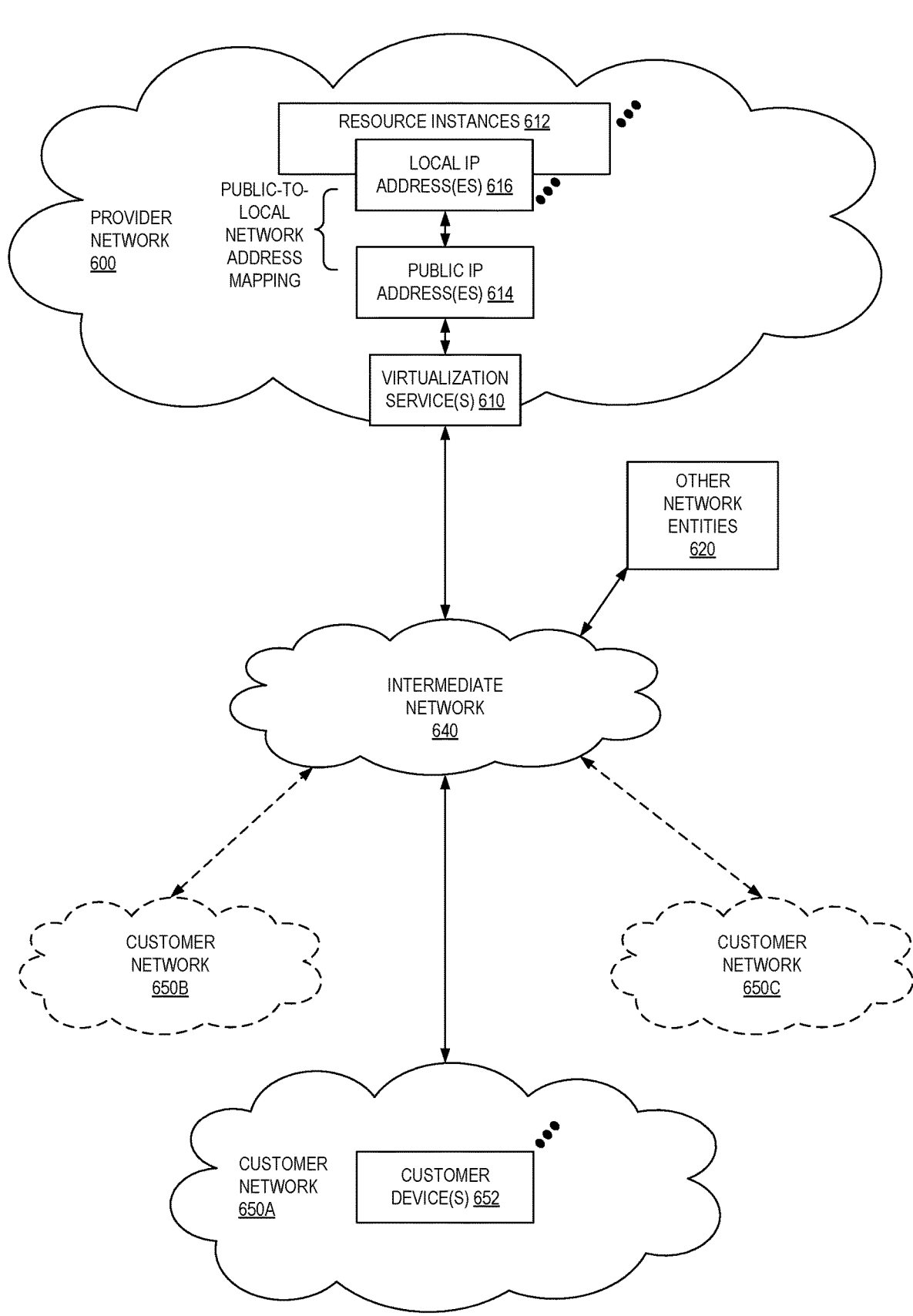
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (Ipv6) addresses) that customers can obtain from the provider network 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
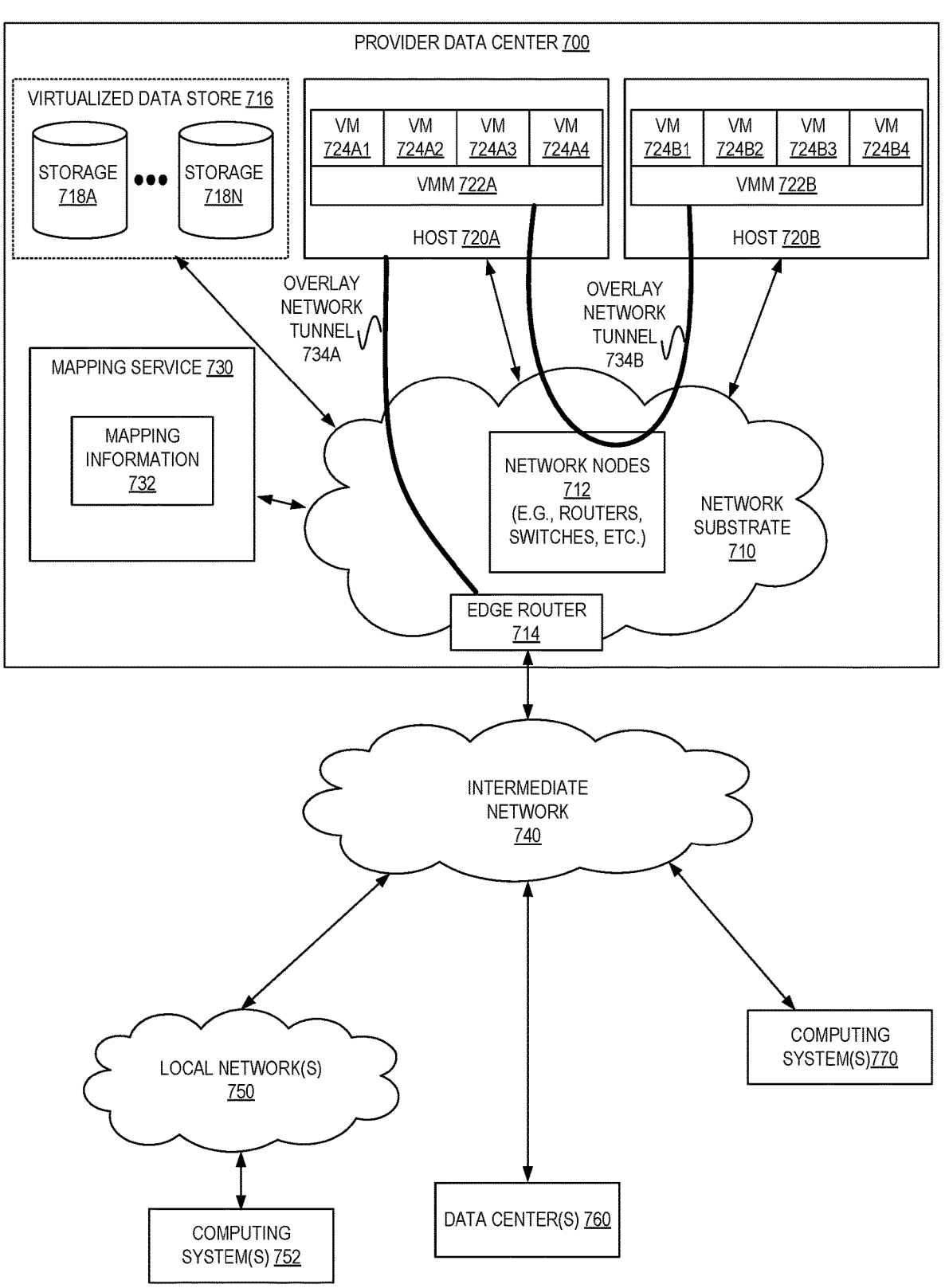
FIG. 7 illustrates an example data center that implements an overlay network on a network substrate using IP tunneling technology according to some embodiments.

FIG. 7 illustrates an example data center that implements an overlay network on a network substrate using IP tunneling technology, according to some embodiments. A provider data center 700 may include a network substrate that includes networking nodes 712 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 710 using tunnels. The IP tunneling technology may provide a mapping and encapsulating system for creating an overlay network on a network (e.g., a local network in data center 700 of FIG. 7) and may provide a separate namespace for the overlay layer (the public IP addresses) and the network substrate 710 layer (the local IP addresses). Packets in the overlay layer may be checked against a mapping directory (e.g., provided by mapping service 730) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 730) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 7, an example overlay network tunnel 734A from a virtual machine (VM) 724A (of VMs 724A1-724A4, via VMM 722A) on host 720A to a device on the intermediate network 750 and an example overlay network tunnel 734B between a VM 724A (of VMs 724A1-724A4, via VMM 722A) on host 720A and a VM 724B (of VMs 724B1-724B4, via VMM 722B) on host 720B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending and stripped from the packet address upon receiving. As an example, the overlay network may be implemented using 32-bit Ipv4 (Internet Protocol version 4) addresses as the public IP addresses, and the Ipv4 addresses may be embedded as part of 128-bit Ipv6 (Internet Protocol version 6) addresses used on the substrate network as the local IP addresses.

Referring to FIG. 7, at least some networks in which embodiments may be implemented may include hardware virtualization technology that enables multiple operating systems to run concurrently on a host computer (e.g., hosts 720A and 720B of FIG. 7), e.g., as virtual machines (VMs) 724 on the hosts 720. The VMs 724 may, for example, be executed in slots on the hosts 720 that are rented or leased to customers of a network provider. A hypervisor, or virtual machine monitor (VMM) 722, on a host 720 presents the VMs 724 on the host with a virtual platform and monitors the execution of the VMs 724. Each VM 724 may be provided with one or more local IP addresses; the VMM 722 on a host 720 may be aware of the local IP addresses of the VMs 724 on the host. A mapping service 730 may be aware of (e.g., via stored mapping information 732) network IP prefixes and IP addresses of routers or other devices serving IP addresses on the local network. This includes the IP addresses of the VMMs 722 serving multiple VMs 724. The mapping service 730 may be centralized, for example on a server system, or alternatively may be distributed among two or more server systems or other devices on the network. A network may, for example, use the mapping service technology and IP tunneling technology to, for example, route data packets between VMs 724 on different hosts 720 within the data center 700 network; note that an interior gateway protocol (IGP) may be used to exchange routing information within such a local network.

In addition, a network such as the provider data center 700 network (which is sometimes referred to as an autonomous system (AS)) may use the mapping service technology, IP tunneling technology, and routing service technology to route packets from the VMs 724 to Internet destinations, and from Internet sources to the VMs 724. Note that an external gateway protocol (EGP) or border gateway protocol (BGP) is typically used for Internet routing between sources and destinations on the Internet. FIG. 7 shows an example provider data center 700 implementing a network that provides resource virtualization technology and that provides full Internet access via edge router(s) 714 that connect to Internet transit providers, according to some embodiments. The provider data center 700 may, for example, provide customers the ability to implement virtual computing systems (VMs 724) via a hardware virtualization service and the ability to implement virtualized data stores 716 on storage resources 718A-718N via a storage service.

The data center 700 network may implement IP tunneling technology, mapping service technology, and a routing service technology to route traffic to and from virtualized resources, for example to route packets from the VMs 724 on hosts 720 in data center 700 to Internet destinations, and from Internet sources to the VMs 724. Internet sources and destinations may, for example, include computing systems 770 connected to the intermediate network 740 and computing systems 752 connected to local networks 750 that connect to the intermediate network 740 (e.g., via edge router(s) 714 that connect the network 750 to Internet transit providers). The provider data center 700 network may also route packets between resources in data center 700, for example from a VM 724 on a host 720 in data center 700 to other VMs 724 on the same host or on other hosts 720 in data center 700.

A service provider that provides data center 700 may also provide additional data center(s) 760 that include hardware virtualization technology similar to data center 700 and that may also be connected to intermediate network 740. Packets may be forwarded from data center 700 to other data centers 760, for example from a VM 724 on a host 720 in data center 700 to another VM on another host in another, similar data center 760, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 718A-718N, as virtualized resources to customers of a network provider in a similar manner.

Figure 8:
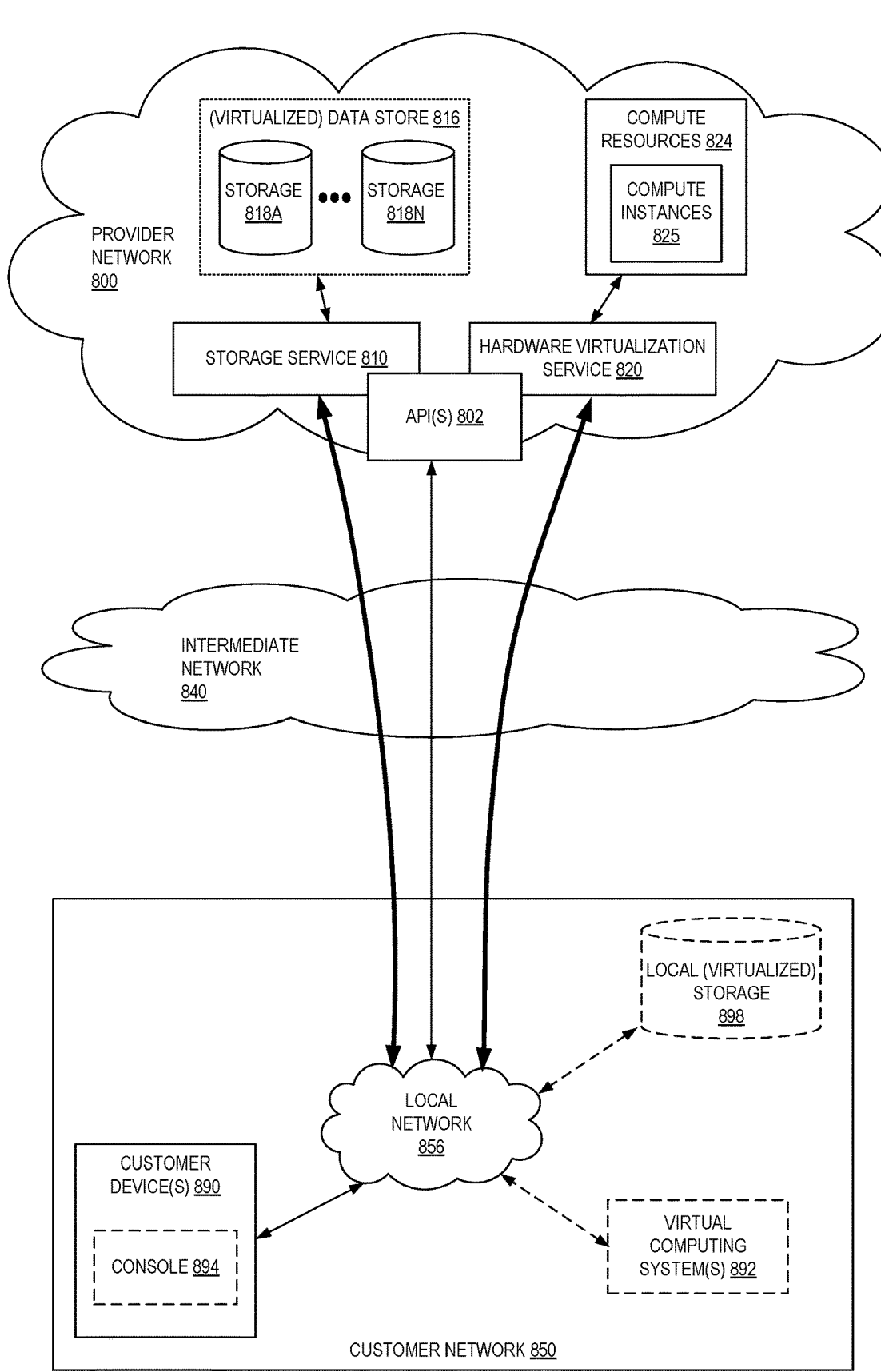
FIG. 8 is a block diagram of an example provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Figure 9:
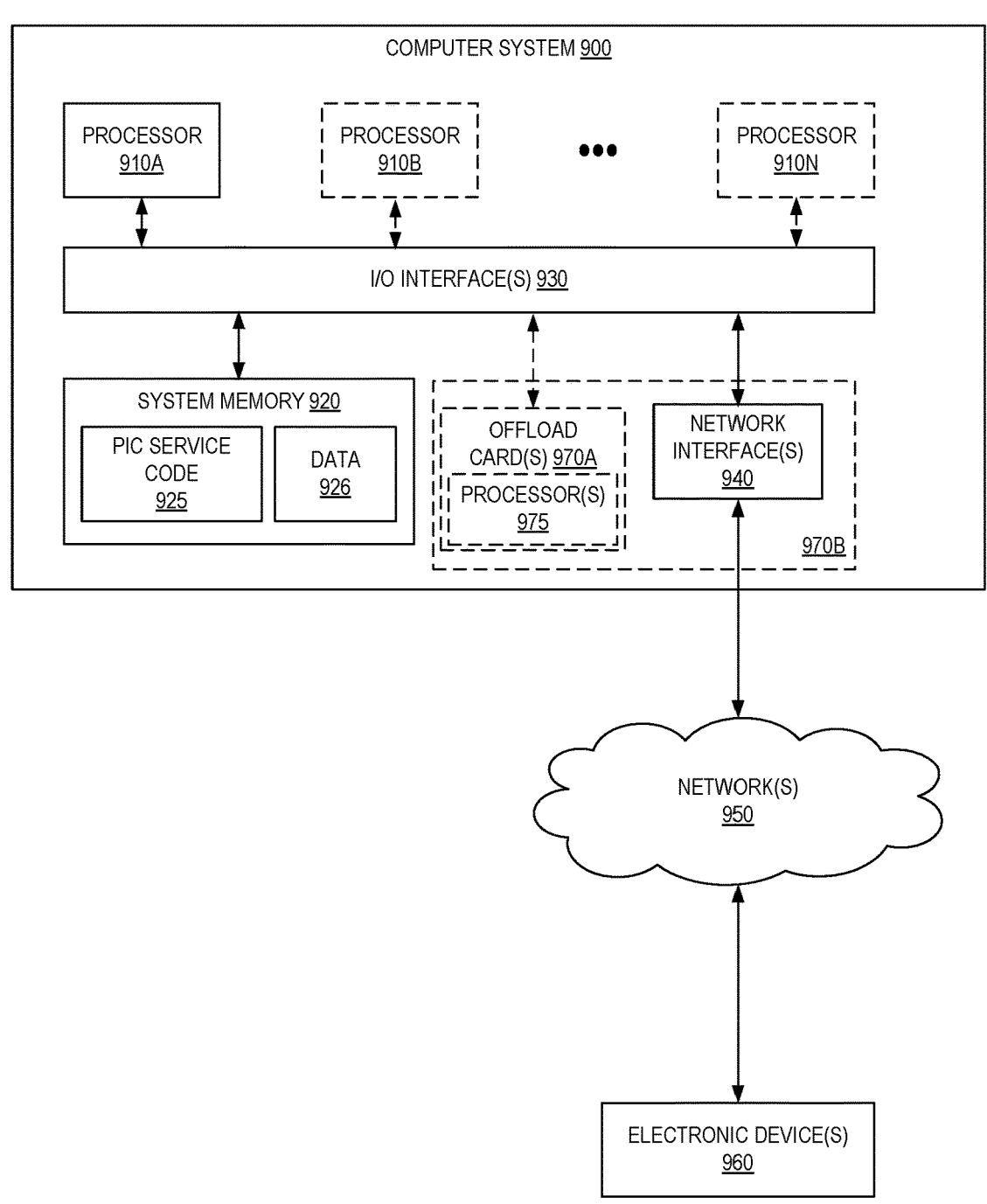
FIG. 9 is a block diagram illustrating an example computer system that can be used in some examples.

In some examples, a system that implements a portion or all of the techniques described herein can include a general-purpose computer system, such as the computer system 900 (also referred to as a computing device or electronic device) illustrated in FIG. 9, that includes, or is configured to access, one or more computer-accessible media. In the illustrated example, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various examples the computer system 900 can include one computing device or any number of computing devices configured to work together as a single computer system 900.

In various examples, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as PIC service code 925 (e.g., executable to implement, in whole or in part, a PIC service or a PIC service host such as described herein) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computer system 900. However, in some examples the virtualization manager implemented by the offload card(s) 970A or 970B can accommodate requests from other entities (e.g., from compute instances themselves), and cannot coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving, at a service of a cloud provider network, one or more messages from an electronic device to establish a WebSocket connection, the one or more messages including a virtual network endpoint identifier and a first address of an instance hosted by the cloud provider network, wherein the first address is an address of the instance on a first virtual network;

establishing, by the service, the WebSocket connection between the electronic device and the service;

identifying the first virtual network based at least in part on the virtual network endpoint identifier, the first virtual network including a virtual network endpoint associated with the virtual network endpoint identifier, wherein the virtual network endpoint has a second address on the first virtual network;

receiving, via the WebSocket connection, a first Web-Socket message including a first payload from the electronic device;

generating, by the service, a first Transmission Control Protocol/Internet Control (TCP/IP) message including at least a portion of the first payload to the instance, wherein the first TCP/IP message includes the second address of the virtual network endpoint as a source address;

sending, from the service to the virtual network endpoint, the first Transmission Control Protocol/Internet Control (TCP/IP) message;

receiving, by the service, a second TCP/IP message including a second payload from the instance, wherein the second TCP/IP message includes the second address of the virtual network endpoint as a destination address;

generating, by the service, a second WebSocket message including at least a portion of the second payload; and sending, from the service to the electronic device via the WebSocket connection, the second WebSocket message to the electronic device.

2. The computer-implemented method of claim 1, further comprising:

copying the portion of the first payload from the first WebSocket message into the first TCP/IP message; and copying the portion of the second payload from the second TCP/IP message into the second WebSocket message.

3. The computer-implemented method of claim 1, further comprising establishing, by the service, a TCP session with the instance hosted by the cloud provider network, wherein a handshake associated with the WebSocket connection is completed after establishing the TCP session with the instance.

4. A computer-implemented method comprising:

receiving, from an electronic device to a service of a provider network via a WebSocket connection, a first WebSocket message including a first payload from an electronic device;

generating, by the service of the provider network, a first Transmission Control Protocol/Internet Protocol (TCP/IP) message including at least a portion of the first payload;

sending the first TCP/IP message to an instance hosted by a cloud provider network, wherein the instance has a first network address on a first virtual network, and wherein the first TCP/IP message includes a second network address as a source address, wherein traffic originating from the second network address is routable to the first virtual network;

receiving, by the service of the provider network, a second TCP/IP message including a second payload from the instance, wherein the second TCP/IP message includes the second network address as a destination address;

generating, by the service of the provider network, a second WebSocket message including at least a portion of the second payload; and sending, from the service of the provider network to the electronic device via the WebSocket connection, the second WebSocket message to the electronic device.

5. The computer-implemented method of claim 4, wherein the second network address is associated with a virtual network endpoint of the first virtual network.

6. The computer-implemented method of claim 4, further comprising:

copying the portion of the first payload from the first WebSocket message into the first TCP/IP message; and copying the portion of the second payload from the second TCP/IP message into the second WebSocket message.

7. The computer-implemented method of claim 4, wherein the WebSocket connection is between a service of the cloud provider network and the electronic device, and further comprising:

receiving, at the service, one or more messages from the electronic device to establish the WebSocket connection, the one or more messages including a virtual network endpoint identifier and the first address of the instance; and establishing the WebSocket connection with the electronic device.

8. The computer-implemented method of claim 7, wherein the virtual network endpoint identifier is associated with a virtual network endpoint of the first virtual network, the virtual network endpoint having (a) the second network address and (b) an associated security group that permits traffic to transit from the virtual network endpoint to the instance.

9. The computer-implemented method of claim 7, wherein the virtual network endpoint identifier is or is associated with a Geneve protocol virtual network identifier.

10. The computer-implemented method of claim 7, wherein the one or more messages from the electronic device include an identity credential, and further comprising authenticating the identity credential with an identity and access management service of the cloud provider network.

11. The computer-implemented method of claim 7, further comprising logging establishment of the WebSocket connection with a logging service of the cloud provider network.

12. The computer-implemented method of claim 7, further comprising establishing, by the service, a TCP session with the instance hosted by the cloud provider network.

13. The computer-implemented method of claim 12, wherein a handshake associated with the WebSocket connection is completed after establishing the TCP session with the instance.

14. The computer-implemented method of claim 7, wherein the first TCP/IP message is sent to the instance by the service via a routing service of the cloud provider network, and wherein the second TCP/IP message is received from the instance by the service via the routing service.

15. A system comprising:

a first one or more electronic devices to host an instance in a cloud provider network; and a second one or more electronic devices to implement an instance connect service in the cloud provider network, the instance connect service including instructions that upon execution cause the instance connect service to:

receive, from a third electronic device to the instance connect service via a WebSocket connection, a first WebSocket message including a first payload from an electronic device;

generate, by the instance connect service, a first Transmission Control Protocol/Internet Protocol (TCP/IP) message including at least a portion of the first payload;

send the first TCP/IP message to the instance, wherein the instance has a first network address on a first virtual network, and wherein the first TCP/IP message includes a second network address as a source address, wherein traffic originating from the second network address is routable to the first virtual network;

receive, by the instance connect service, a second TCP/IP message including a second payload from the instance, wherein the second TCP/IP message includes the second network address as a destination address;

generate, by the instance connect service, a second WebSocket message including at least a portion of the second payload; and send, from the instance connect service to the third electronic device, via the WebSocket connection, the second WebSocket message to the electronic device.

16. The system of claim 15, wherein the second network address is associated with a virtual network endpoint of the first virtual network.

17. The system of claim 15, wherein the instance connect service includes further instructions that upon execution cause the instance connect service to:

copy the portion of the first payload from the first WebSocket message into the first TCP/IP message; and copy the portion of the second payload from the second TCP/IP message into the second WebSocket message.

18. The system of claim 15, wherein the WebSocket connection is between a service of the cloud provider network and the electronic device, and wherein the instance connect service includes further instructions that upon execution cause the instance connect service to:

receive, at the service, one or more messages from the electronic device to establish the WebSocket connection, the one or more messages including a virtual network endpoint identifier and the first address of the instance; and establish the WebSocket connection with the electronic device.

19. The system of claim 18, wherein the virtual network endpoint identifier is associated with a virtual network endpoint of the first virtual network, the virtual network endpoint having (a) the second network address and (b) an associated security group that permits traffic to transit from the virtual network endpoint to the instance.

20. The system of claim 18, wherein the virtual network endpoint identifier is or is associated with a Geneve protocol virtual network identifier.

* * * * *